Jan. 6, 1948. W. W. SLOANE 2,434,127
SHAKER CONVEYOR
Filed May 17, 1946 3 Sheets-Sheet 1
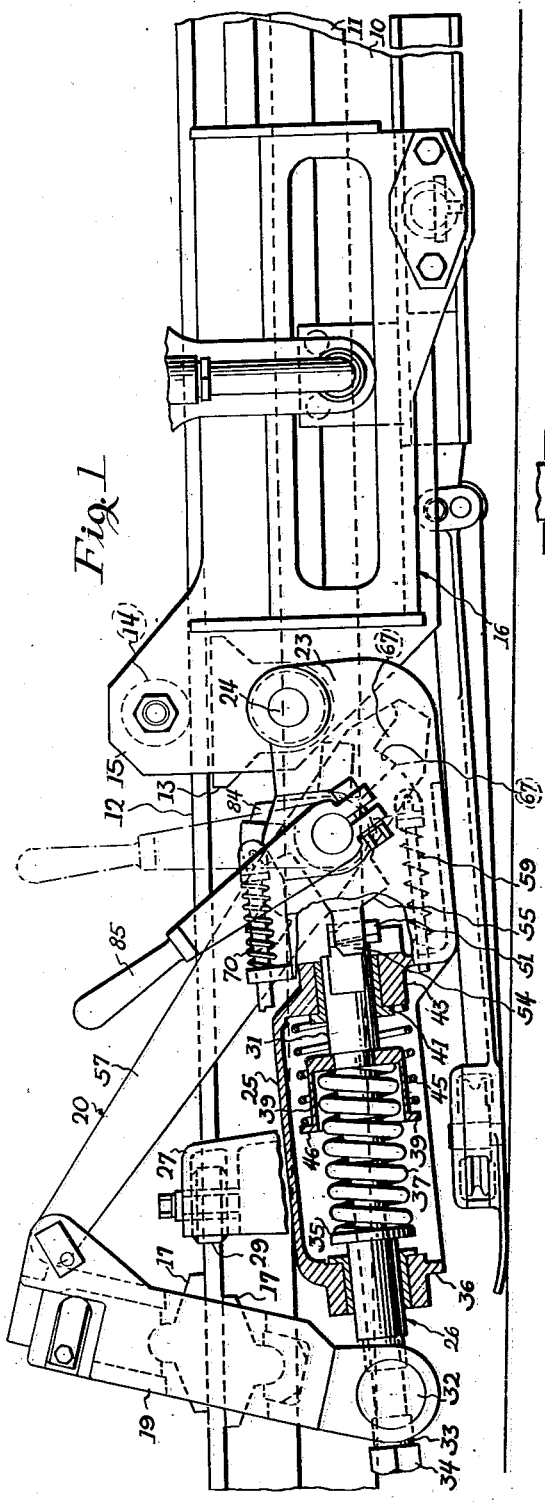
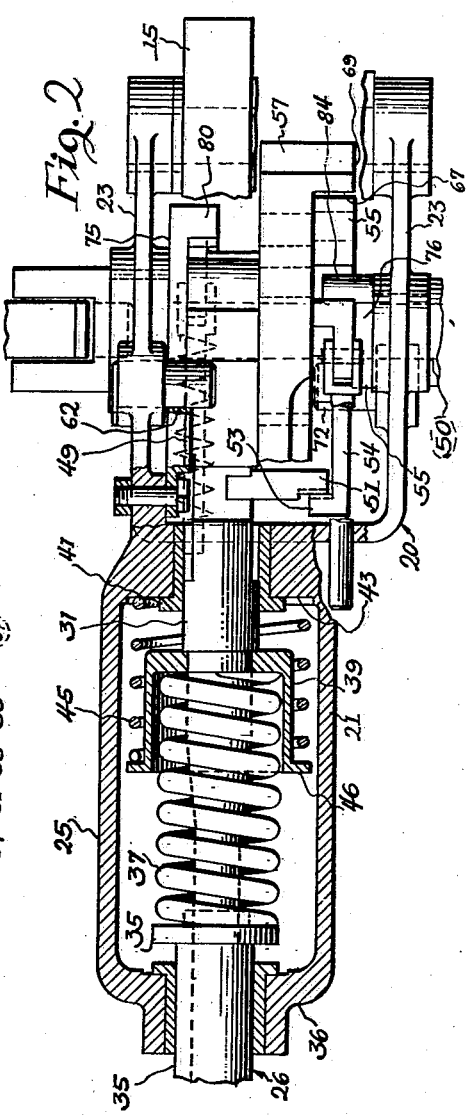
INVENTOR
William W. Sloane
Clarence J. Poole
ATTORNEY Jan. 6, 1948.  W. W. SLOANE  2,434,127

SHAKER CONVEYOR

Filed May 17, 1946  3 Sheets-Sheet 2

INVENTOR
William W. Sloane
Clarence F. Poole
ATTORNEY

Jan. 6, 1948. W. W. SLOANE 2,434,127
SHAKER CONVEYOR
Filed May 17, 1946 3 Sheets-Sheet 3
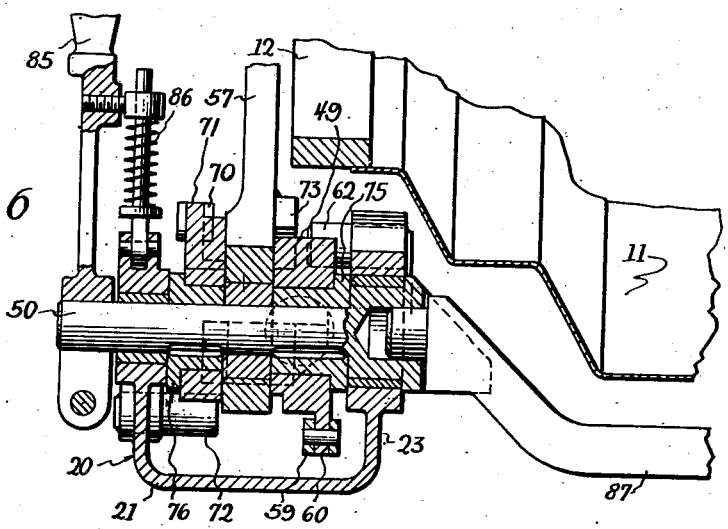
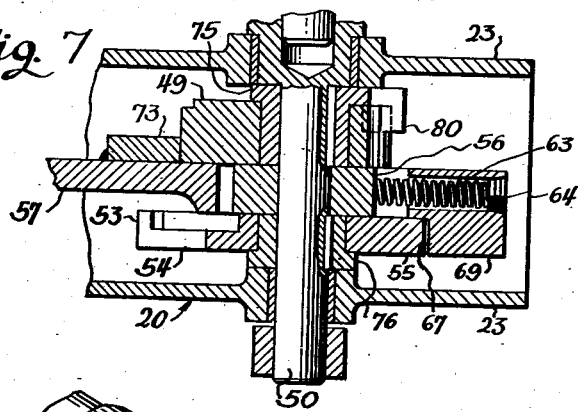
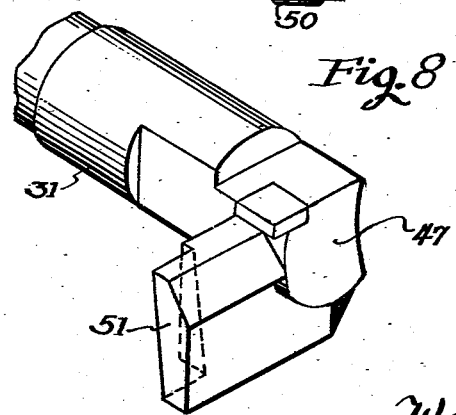
INVENTOR
William W. Sloane
Clarence F. Poole
ATTORNEY Patented Jan. 6, 1948

2,434,127

UNITED STATES PATENT OFFICE 2,434,127

SHAKER CONVEYOR

William W. Sloane, Chicago, Ill., assignor to Goodman Manufacturing Company, Chicago, Ill., a corporation of Illinois Application May 17, 1946, Serial No. 670,490

9 Claims. (Cl. 198—14)

This invention relates to improvements in shaker conveyors and more particularly relates to an improved and simplified feeder head for automatically extending or retracting an extensible trough of a shaker conveyor with respect to a shaker conveyor trough line.

The principal objects of my invention are to provide a novel and simplified form of feeder head for automatically extending or retracting an extensible trough of a shaker conveyor with respect to a shaker conveyor trough line, which is of a more efficient and positive action than former feeder heads and is so arranged as to increase the effective feeding movement of the extensible trough during each stroke of the conveyor and to reduce the need for frequent adjustment of the grip blocks of the feeder head, to enable it to retain its efficiency.

An application Serial No. 620,362, filed by me on Oct. 4, 1945, relates to a shaker conveyor feeder head somewhat similar to that shown in my present application. My present invention, however, differs from that shown in my prior application in that a stopping means is provided for each link on each side of the conveyor, which is movable into position to positively move the links which serve as the feeding members with the reciprocating trough of the conveyor during both the forward and return strokes of the conveyor for substantially the full length of the strokes thereof, and which permits the other links to move relatively freely with respect to their supporting frames.

These and other objects of my invention will appear from time to time as the following specification proceeds and with reference to the accompanying drawings wherein:

Figure 1 is a view in side elevation of the inby end of a shaker conveyor trough line having a feeder head constructed in accordance with my invention embodied therein, with certain parts of the feeder head shown in substantially longitudinal section;

Figure 2 is an enlarged partial fragmentary detail plan view of a portion of the feeding mechanism, with certain parts thereof shown in horizontal section;

Figure 6 is a fragmentary transverse sectional view taken through one side of the feeding mechanism;

Figure 7 is a fragmentary transverse sectional view taken substantially along line 7—7 of Figure 4; and Figure 8 is an enlarged isometric view showing certain details of the inner end of one of the yieldable links of the feeding mechanism.

Figure 3:
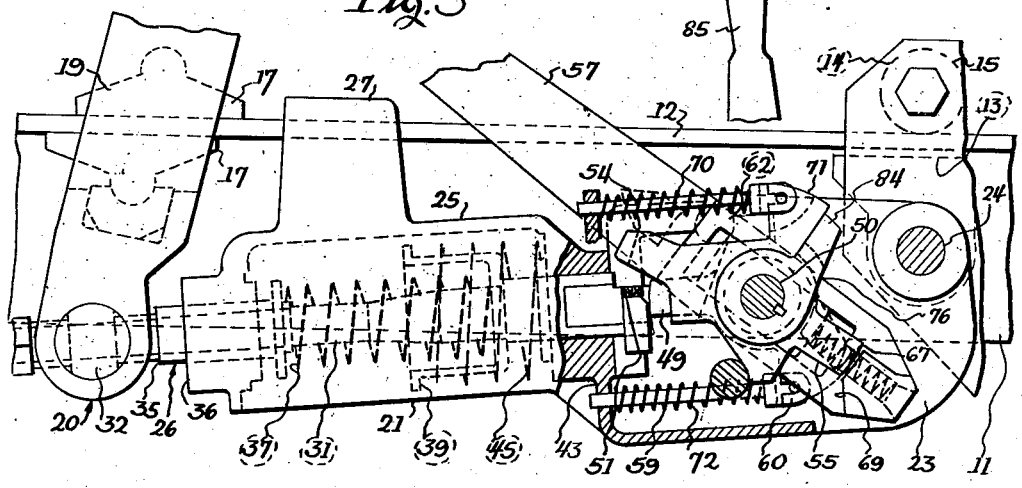
Figure 3 is a partial fragmentary diagrammatic view of the feeding mechanism in side elevation, with the control lever for operating the feeding mechanism shown as being in a neutral position and with certain parts of the feeding mechanism shown in substantially longitudinal section.

The embodiment of my invention illustrated in the drawings includes generally a reciprocating trough 10 connected to the inby end of a shaker conveyor trough line (not shown) and reciprocably driven therefrom. Said reciprocating trough has an extensible trough 11 mounted for extensible or retractible movement with respect thereto. The forward end of said extensible trough may be slidably supported on the ground on a shovel (not shown) extending therefrom, which is provided to pick up loose material from the ground. The rear end of said extensible trough may be slidably supported above the ground on a ground-engaging shoe (not shown) in a manner similar to that shown in a prior patent to Ernst R. Bergmann, Re. 21,027, and no part of my present invention, so not herein shown or described.

The extensible trough 11 has two bearing plates 12, 12 which extend along its upper outer edges and form a supporting means for the forward end of the reciprocating trough 10 between transversely pivoted shoes 13, 13 and rollers 14, 14 spaced above said shoes. Said rollers and shoes are mounted on opposite upright sides 15, 15 of a supporting frame 16, projecting above the top of said reciprocating trough. Said supporting frame is secured to and extends forwardly of and across the bottom of said reciprocating trough.

The bearing plates 12, 12 are also adapted to be engaged by friction grip blocks 17, 17 mounted in carrier members 19, 19 of a friction grip feeding device 20, for extensibly or retractibly moving said extensible trough with respect to said reciprocating trough, or for reciprocably moving said extensible and reciprocating troughs together.

The feeding device 20, including the carrrier members 19, 19, the friction grip blocks 17, 17 and the mechanism for operating said grip blocks, is the same on each side of the conveyor so need only be described in detail for one side of the conveyor. Said feeding device includes a connecting frame 21 pivotally connected to and extending forwardly from the forward end of each upright side wall 15 of the support frame 16. Said connecting frame 21 has two laterally spaced rear side walls 23, 23 which extend along opposite sides of the side wall 15 and are transversely pivotally connected thereto by means of a pivotal pin 24, in the manner described in my aforementioned application Serial No. 620,362, so not herein shown or described in detail. Said pivotal pin also forms a pivotal mounting for the bearing shoe 13.

The connecting frame 21 has a housing and guide portion 25 open at its bottom, which extends forwardly of said side walls and forms a slidable guide for a yieldable link 26. Said yieldable link is pivotally connected at its forward end to the lower end of the carrier member 19. An integrally formed bracket 27 extends upwardly from the top of said guide portion of said connecting frame, intermediate the ends thereof, and has a roller 29 mounted adjacent its upper end. Said roller extends in a plane parallel to the bearing plate 12 and is adapted to engage the outer side of said bearing plate, to form a guide means for said connecting frame on said bearing plate (see Figure 1).

The yieldable link 26 includes a shaft 31 slidably connected with the lower end of the carrier member 19 on a transversely extending pin 32 pivotally mounted in the lower end of said carrier member. A collar 33 slidably mounted on said shaft, abuts the advance side of the pin 32. A nut 34 threaded on the forward end of said shaft abuts said collar and serves to retain said shaft on said pin, and also forms a means for adjusting the effective length of said yieldable link. A flanged sleeve 35 is slidably mounted on said shaft on the opposite side of said pin 32 from said collar and abuts the rear side of said pin. Said sleeve is slidably mounted in a forward end wall 36 of the guide portion 25 of the connecting frame 21, and the flange of said sleeve is disposed on the rear or inside of said end wall. A compression spring 37 encircles said shaft and is interposed between the flange of said flanged sleeve and a cup-shaped retaining member 39, within which said spring is seated. The strength of said spring is such that said yieldable link normally acts as a solid member and only yields to release the grip blocks 17, 17 from the bearing plate 12 upon extreme overload conditions. The inner end of said shaft 31 is slidably mounted in a bearing sleeve 41, mounted in an inner end wall 43 of said guide portion of said connecting frame. Said shaft extends through said inner end wall and is slidably movable with respect thereto in the direction of its axis.

A spring 45 encircles the retaining member 39 and abuts a flanged portion 46 of said retaining member at its forward end. The opposite end of said spring abuts the forward end of the inner end wall 43 of the connecting frame 21. Said spring serves to urge the yieldable link 26 in a forward direction along the guide portion 25 of the connecting frame 21, to hold the carrier member 19 in position to engage the grip blocks 17, 17 with the bearing plate 12 at the ends of the return strokes of the conveyor, to assure that said grip blocks grippingly engage said bearing plate for the entire length of the forward strokes of the conveyor.

The shaft 31 extends rearwardly beyond the inner end wall 43 and has a slightly concave arcuate engaging end portion 47, which is adapted to be engaged by the engaging end of a holding cam 49. Said holding cam is mounted coaxially of a transverse shaft 50 for free movement with respect thereto, and is operable to react against and positively move said link with said shaft for substantially the full length of the forward strokes of the conveyor. This will transmit a force from the reciprocating trough 10 through the yieldable link 26 to the lower end of the carrier member 19 during the forward strokes of the conveyor, in a direction to engage the grip blocks 17, 17 with the bearing plate 12. During the return strokes of the conveyor, said yieldable link being pulled rearwardly by said reciprocating trough will exert a force against the lower end of said carrier member in an opposite or return direction, to release said grip blocks from said bearing plate.

The inner or rear end of the shaft 31 has a lateral projection 51 which extends towards the outer side wall 23 of the connecting frame 21 (see Figure 8). A forward engaging face of said lateral projection is adapted to be engaged by an inwardly extending end 53 of an arm 54, which projects forwardly from a holding cam 55 and forms a stop for said shaft to move said shaft with the reciprocating trough 10 for substantially the full length of the return strokes of the conveyor when the holding cam 49 is in position to engage the engaging end 47 of said shaft. Said holding cam 55 is freely mounted on the shaft 50 and serves to engage and move a link 57 with said shaft and reciprocating trough during the return strokes of the conveyor, for substantially the full length of the strokes thereof.

The link 57 is pivotally connected with the upper end of the carrier member 19 and extends rearwardly therefrom in a downwardly inclined direction to and beyond said shaft 50, and is slidably mounted on said shaft on a block 56. Said link 57 serves to engage the grip blocks 17, 17 with the bearing plate 12 during the return strokes of the conveyor and to release said grip blocks from said bearing plate during the forward strokes of the conveyor, to retractibly move the extensible trough 11 with respect to said reciprocating trough.

It should here be noted that a slight amount of clearance is provided between the engaging end of the holding cam 49 and the end portion 47 of the shaft 31, to permit said holding cam to readily move into engagement with said end portion of said shaft at the end of a return stroke of the conveyor. A slight amount of clearance is also provided between the inwardly extending end 53 of the arm 54, to permit said inwardly extending end of said arm to move into position where it may engage the laterally extending projection 51 of the shaft 31.

A spring pressed plunger 59 is provided to move the holding cam 49 into engagement with the engaging end portion 47 of the shaft 31. Said plunger is slidably mounted in the inner end wall 43 of the connecting frame 21, adjacent the lower end thereof, and is pivotally connected with a depending radial wing 60 of said holding cam. Said plunger acts in a direction to move said cam in a counterclockwise direction. A pin 62 is provided to limit movement of said holding cam in either direction of movement thereof.

A spring 63 is provided to hold the link 57 in a position along the block 56 to hold the carrier member 19 in position to engage the friction grip blocks 17, 17 with a bearing plate 12, at the extreme ends of the forward strokes of the conveyor, to assure that said blocks grip said bearing plate for substantially the entire length of the return strokes of the conveyor, when it is desired to retractibly move the extensible trough 11 with respect to the reciprocating trough 10. Said spring 63 is interposed between the underside of said block 56 and the inside of a plug 64 threaded in a drilled lower end portion of said link (see Figure 7).

The engaging end of the holding cam 55 is adapted to engage an upwardly facing engaging surface 67 formed on a lug 69 extending outwardly from the lower end portion of the link 57, to reciprocably move said link with said shaft during the return strokes of the conveyor, for substantially the full length of said return strokes. A slight clearance is provided between the end of said cam and said engaging surface at the end of the forward strokes of the conveyor to permit said cam to readily move into position to engage said link. When said link moves with said shaft, said link will transmit a force on the upper end of the carrier member 19 in a direction to engage the grip blocks 17, 17 with the bearing plate 12 on the return strokes of the conveyor, and to disengage said grip blocks from said bearing plate upon the forward strokes of the conveyor, to retractibly move said extensible trough with respect to said reciprocating trough.

A spring pressed plunger 70 is provided to move the cam 55 into engagement with the engaging surface 67 at the end of a forward stroke of the conveyor and hold the link 57 for movement with the shaft 50 during the return strokes of the conveyor. Said plunger is slidably mounted in the inner end wall 43 of said connecting frame, adjacent the upper end thereof, and is pivotally connected with a radial wing 71 of said cam. A pin 72 is provided to limit movement of said cam in either direction of movement thereof.

The link 57 also has a stop 73 extending inwardly therefrom and spaced upwardly from the transverse shaft 50. Said stop is adapted to be engaged by the engaging end of the holding cam 49, when said cam is disengaged from the engaging end 47 of the shaft 31, and when the holding cam 55 is in engagement with the engaging surface 67, to move said link 57 with the shaft 50 during the forward strokes of the conveyor for substantially the full length thereof, and assure positive disengagement of the grip blocks 17, 17 from the bearing plate 12 for the entire length of the return strokes of the conveyor.

The holding cams 49 and 55 are positively moved out of holding engagement with their respective links 26 and 57 and are moved into holding engagement with the opposite links 57 and 26 respectively, or are released to permit the respective spring pressed plungers 59 and 70 to move said cams to positions to hold either of the links 26 or 57 for movement with the reciprocating trough 10 by means of individual engaging members 75 and 76, keyed on the transverse shaft 50.

The engaging member 75 has the holding cam 49 freely mounted thereon. Said engaging member has an engaging end 80 extending outwardly from a flanged inner portion thereof and inwardly therefrom, into position to engage the wing 60 of said holding cam (see Figures 4 and 7). When said engaging member is moved in a direction which in Figure 1 is shown as being a counterclockwise direction from the position shown in Figure 4 to the position shown in Figure 5, its engaging end 80 will move away from said wing 60, to permit the spring pressed plunger 59 to move said holding cam into position to engage the engaging end 47 of the shaft 31 of the yieldable link 26, at the end of a return stroke of the conveyor. When said engaging member is moved in an opposite direction from the position shown in Figure 5 to the position shown in Figure 4, it will move freely until it comes into contact with the wing 60. It will then move said holding cam in a direction to positively disengage said holding cam from said engaging end of said shaft. Further movement of said holding cam in the same direction will move the engaging end of said holding cam into position to engage the stop 73.

The engaging member 76 has the holding cam 55 freely mounted thereon and has a radially extending engaging end 84 extending inwardly from said holding cam. Said inwardly extending end of said engaging member is adapted to have engagement with the radial wing 71 of said holding cam, on the side thereof which is opposite from the spring pressed plunger 70. Pivotal movement of the shaft 50 in a clockwise direction from the position shown in Figure 5 to that shown in Figure 4, will move said engaging end of said engaging member away from said radial wing 71, to permit said spring pressed plunger 70 to move said holding cam in the direction of movement of said engaging member out of position to be engaged by the outwardly projecting inner end of the shaft 31, and into position to drop into engagement with the engaging surface 67 of the link 57, at the end of a forward stroke of the conveyor. At the same time the engaging surface of the holding cam 49 will be moved into position to engage the stop 73. Movement of said engaging member in a counterclockwise direction from the position shown in Figure 4 to that shown in Figure 5 will positively release said holding cam from said engaging surface 67 and will move said inwardly extending end 53 of said holding cam into position to engage the lateral projection 51 of the shaft 31, to move said shaft with said connecting frame during the return strokes of the conveyor, for substantially the full length of the strokes thereof.

Movement of the shaft 50 is effected by means of a hand lever 85 mounted on the outer end of said shaft and held in any one of its operating positions by a spring link 86, in the manner clearly shown and described in my prior application Serial No. 620,362, so not herein described in detail.

The transverse shafts 50, 50 on opposite sides of the conveyor are connected to operate together by means of a transversely extending drive member 87 extending downwardly from said shafts beneath the trough, and operatively connected with the inner ends of said shafts, in a well known manner.

Figure 5:
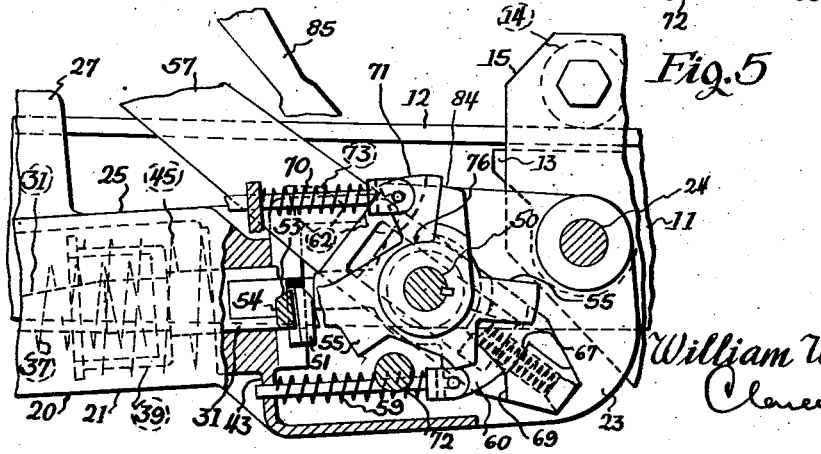
Figure 5 is a fragmentary diagrammatic view somewhat similar to Figure 4, but showing the control lever for operating the feeding mechanism in position to extend the extensible trough of the conveyor.

When it is desired to extend the extensible trough 11 with respect to the reciprocating trough 10, the control lever 85 is placed in the forwardly inclined position shown in Figure 5. The holding cams 49, 49 will then react against the yieldable links 26, 26 to positively move said links with the reciprocating trough 10 upon the forward strokes of the conveyor, and the stops 53, 53 will react against said links upon the return strokes of the conveyor to positively move said links in a direction to release said grip blocks. In this position of said hand lever, the links 57, 57 will be relatively free to move along the blocks 56, 56 to permit complete freedom of movement of the upper end of said carrier member so as to assure positive engagement of the grip blocks 17, 17 with the bearing plates 12, 12 upon the forward strokes of the conveyor for substantially the full length of the strokes thereof, and full disengagement of said grip blocks from said bearing plates upon the return strokes of the conveyor for substantially the full length of the strokes thereof.

Figure 4:
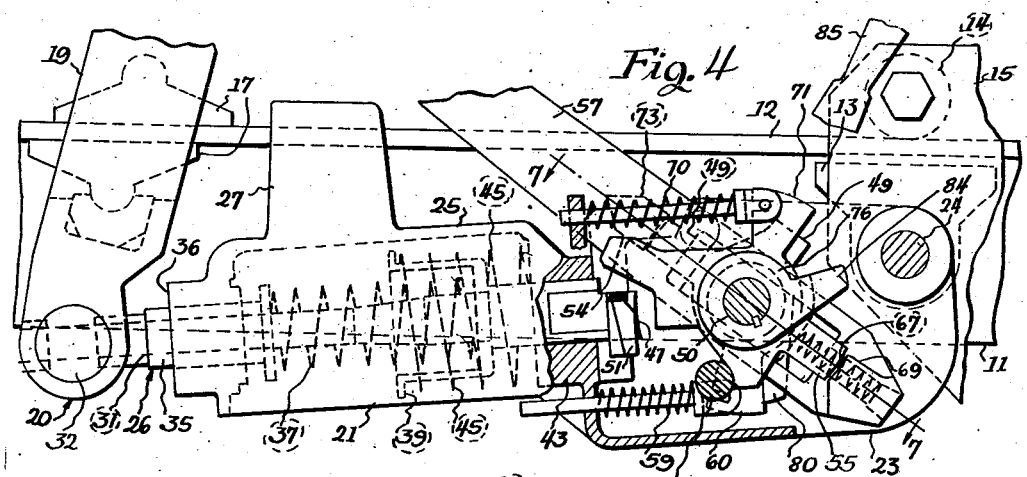
Figure 4 is a diagrammatic view somewhat similar to Figure 3, but showing the control lever for operating the feeding mechanism in position to retract the extensible trough of the conveyor.

When it is desired to retractibly move the extensible trough 11 with respect to the reciprocating trough 10, the control lever 85 is positioned as shown in Figure 4. The engaging ends of the holding cams 55, 55 will then engage the engaging surfaces 67, 67 of the links 57, 57, to positively move said links with said reciprocating trough during the return strokes of the conveyor, and the engaging ends of the holding cams 49, 49 will be moved into position to engage the stops 73, 73 and positively move said links with said reciprocating trough during the forward strokes of the conveyor. In this position of said control lever, the yieldable links 26, 26 will act like the links 57, 57 during the extending operation and will be free to move with respect to their connecting frames 21, 21 to permit complete freedom of movement of the lower end of said carrier member and assure positive engagement and disengagement of said grip blocks 17, 17 for substantially the full length of the return and forward strokes of the conveyor respectively.

When the control lever 85 is in the position shown in Figure 3, the engaging ends of the holding cams 49, 49 will engage the ends of the shafts 31, 31, and the engaging ends of the holding cams 55, 55 will engage the engaging surfaces 67, 67 of the links 57, 57, to engage the grip blocks 17, 17 with the bearing plates 12, 12 during both the forward and return strokes of the conveyor, to reciprocably move the extensible trough 11 with the reciprocating trough 10. In this position of said control lever, the stops 53, 53 will be out of engagement with the shaft 31, and the engaging surfaces of the cams 49, 49 will be out of engagement with the stops 73, 73.

It may now be seen that the links which serve to engage the grip blocks with the bearing plates 12, 12 upon alternate strokes of the conveyor are positively moved with the reciprocating trough 10 during both the forward and return strokes of the conveyor and the opposite links are free to move with respect to said reciprocating trough, to assure positive engagement and disengagement of the grip blocks during alternate strokes of the conveyor, for substantially the full length of the strokes thereof, to extend or retract said extensible trough with respect to said reciprocating trough.

It may further be seen that lost motion is taken up between the feeding links and the means which moves them back and forth, while the other links are relatively free to move, resulting in a more positive gripping action for a greater length of the strokes of the conveyor than has heretofore been provided and minimizing the amount of adjustment required to keep the grip blocks in efficient operating condition.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding apparatus for shaker conveyors, a reciprocating trough, an extensible trough, a carrier member, a link connecting one end of said carrier member with one of said troughs, another link connecting the opposite end of said carrier member with said one trough, friction grip means mounted on said carrier member for engagement with the other of said troughs, said links being rectilinearly movable with respect to said one trough, a holding cam selectively movable into engagement with one of said links to positively move said link with said reciprocating trough during the forward strokes of the conveyor, another holding cam selectively movable into engagement with said other link to positively move said link with said reciprocating trough during the return strokes of the conveyor, to cause either of said links to exert a force on said carrier member in a direction to engage said grip means with said other trough during alternate strokes of the conveyor, to extensibly or retractibly move one of said troughs with respect to the other, and a stopping means associated with each of said holding cams, said stopping means associated with one holding cam being adapted to move one link with said reciprocating trough in an opposite direction from which said link is moved by its associated holding cam, and coming into position to engage one link when a holding cam for said associated link is in position to engage its respective link.

2. In a feeding apparatus for shaker conveyors, a reciprocating trough, an extensible trough, a carrier member, a link connecting one end of said carrier member with one of said troughs, another link connecting the opposite end of said carrier member with said one trough, friction grip means mounted on said carrier member for engagement with the other of said troughs, said links being rectilinearly movable with respect to said one trough, a holding cam movable into engagement with one of said links to move said link with said reciprocating trough during the forward strokes of the conveyor, another holding cam movable into engagement with said other link to move said other link with said reciprocating trough during the return strokes of the conveyor, means selectively operable to move either of said holding cams into engagement with their respective links, to move either of said links with said reciprocating trough while the other link is relatively free, to cause said link which moves with said reciprocating trough to exert a force on said carrier member in a direction to engage said grip means with said other trough during alternate strokes of the conveyor, to extensibly or retractibly move one of said troughs with respect to the other, and a stopping means associated with each of said holding cams, said stopping means associated with one holding cam for one link being adapted to be moved into position to engage said other link upon movement of said holding cam for said other link into position to engage said other link, so said other link will move with said reciprocating trough for substantially the full length of the forward and return strokes thereof and said one link will be free to move with respect to said reciprocating trough.

3. In a feeding apparatus for shaker conveyors, a reciprocating trough, an extensible trough, a carrier member, a link connecting one end of said carrier member with one of said troughs, another link connecting the opposite end of said carrier member with said one trough, friction grip means mounted on said carrier member for engagement with the other of said troughs, said links being rectilinearly movable with respect to said one trough, a holding cam movable into engagement with one of said links to move said link with said reciprocating trough during the forward strokes of the conveyor, another holding cam movable into engagement with said other link to move said other link with said reciprocating trough during the return strokes of the conveyor, means selectively operable to move either of said holding cams into engagement with their respective links, to move either of said links with said reciprocating trough while the other link is relatively free, to cause said link which moves with said reciprocating trough to move said carrier member into position to engage said grip means with said extensible trough during alternate strokes of the conveyor, to extensibly or retractibly move said extensible troughs with respect to said reciprocating trough, and a stopping means associated with each of said holding cams, said stopping means associated with one holding cam for one link being adapted to be moved to position to engage said other link upon movement of said holding cam for said other link into position to engage said other link, so said other link will move with said reciprocating trough for substantially the full length of the forward and return strokes thereof and said one link will be free to move with respect to said reciprocating trough, and a single operating lever for simultaneously moving said holding cams into position to engage both of said links, to cause said extensible trough to move with said reciprocating trough, and to move said holding cams into position to reciprocably move either link in both directions of movement of said reciprocating trough for substantially the full length of the strokes thereof and release said other link for relatively free movement with respect to said reciprocating trough.

4. In a feeding apparatus for shaker conveyors, a reciprocating trough, an extensible trough, a carrier member, a link connecting one end of said carrier member with one of said troughs, another link connecting the opposite end of said carrier member with said one trough, friction grip means mounted on said carrier member for engagement with the other of said troughs, said links being rectilinearly movable with respect to said one trough, a holding cam selectively movable into engagement with one of said links to positively move said link with said reciprocating trough during the forward strokes of the conveyor, another holding cam selectively movable into engagement with said other link to positively move said other link with said reciprocating trough during the return strokes of the conveyor, to cause either of said links to engage said grip means with said other trough during alternate strokes of the conveyor, to extensibly or retractibly move one of said troughs with respect to the other, and said holding cam for said one link being adapted to engage said other link when said holding cam for said other link is in engagement therewith, to positively move said other link in a direction opposite to which it is moved by its associated holding cam, and said holding cam for said other link being adapted to engage said one link when the holding cam for said one link is in engagement therewith, to positively move said one link in a direction opposite to which it is moved by its associated holding cam, to assure positive engagement and disengagement of said grip means for substantially the full length of alternate strokes of the conveyor.

5. In a feeding apparatus for shaker conveyors, a reciprocating trough, an extensible trough mounted for extensible movement with respect to said reciprocating trough, a carrier member having friction grip blocks mounted therein for engagement with said extensible trough, a link connecting one end of said carrier member with said reciprocating trough, another link connecting the opposite end of said carrier member with said reciprocating trough, a holding cam selectively movable into engagement with one of said links to positively move said link with said reciprocating trough during the forward strokes of the conveyor, another holding cam selectively movable into engagement with said other link to positively move said other link with said reciprocating trough during the return strokes of the conveyor, to cause either of said links to engage said grip blocks with said extensible trough during alternate strokes of the conveyor, and a stopping means associated with each of said holding cams, said stopping means associated with said holding cam for one link being adapted to engage said other link to move said link in an opposite direction from which said link is moved by its associated holding cam, when its associated holding cam is in an engaged position with said other link.

6. In a feeding apparatus for shaker conveyors, a reciprocating trough, an extensible trough mounted for extensible movement with respect to said reciprocating trough, a carrier member having friction grip blocks mounted therein for engagement with said extensible trough, a yieldable link connecting one end of said carrier member with said reciprocating trough, a link connecting the opposite end of said carrier member with said reciprocating trough, said links being slidably movable with respect to said reciprocating trough, a holding cam selectively movable into engagement with said yieldable link, to positively move said link with said reciprocating trough during the forward strokes of the conveyor and cause said link to engage said grip blocks with said extensible trough during the forward strokes of the conveyor, a holding cam selectively movable into engagement with said other link, to positively move said other link with said reciprocating trough during the return strokes of the conveyor and cause said link to engage said grip blocks with said extensible trough during the return strokes of the conveyor, said holding cam for said yieldable link being adapted to engage said other link when said holding cam for said other link is in engagement therewith, to positively move said other link in a direction opposite to which it is moved by its associated holding cam, and said holding cam for said other link being adapted to engage said yieldable link, when the holding cam for said yieldable link is in engagement therewith, to positively move said yieldable link in a direction opposite to which it is moved by its associated holding cam, to assure that said grip blocks positively engage and are disengaged from said extensible trough for substantially the full length of alternate strokes of the conveyor.

7. In a feeding apparatus for shaker conveyors, a reciprocating trough, an extensible trough mounted for extensible movement with respect to said reciprocating trough, a carrier member having friction grip blocks mounted therein for engagement with said extensible trough, a yieldable link connecting one end of said carrier member with said reciprocating trough, a link connecting the opposite end of said carrier member with said reciprocating trough, said links being slidably movable with respect to said trough, a holding cam selectively movable into engagement with said yieldable link, to positively move said link with said reciprocating trough during the forward strokes of the conveyor and cause said link to exert a force on said carrier member in a direction to engage said grip blocks with said extensible trough during the forward strokes of the conveyor, to extensibly move said extensible trough, a holding cam selectively movable into engagement with said other link, to positively move said other link with said reciprocating trough during the return strokes of the conveyor and cause said link to exert a force on said carrier member in a direction to engage said grip blocks with said extensible trough during the return strokes of the conveyor, to retractibly move said extensible trough, said holding cam for said yieldable link being adapted to engage said other link when said holding cam for said other link is in engagement therewith, to positively move said other link in a direction opposite to which it is moved by its associated holding cam, and said holding cam for said other link being adapted to engage said yieldable link, when the holding cam for said yieldable link is in engagement therewith, to positively move said yieldable link in a direction opposite to which it is moved by its associated holding cam, to assure that said grip blocks positively engage and are disengaged from said extensible trough for substantially the full length of alternate strokes of the conveyor, and a single operating lever for moving said holding cams into position to engage both of said links, to cause said extensible trough to reciprocably move with said reciprocating trough, and to move said holding cams into position to reciprocably move either one of said links in both directions of movement of said reciprocating trough for substantially the full length of the strokes of said reciprocating trough.

8. In a feeding mechanism for shaker conveyors, two reciprocating troughs, one of which is extensible with respect to the other, a carrier member, friction grip means mounted in said carrier member for engagement with said extensible trough, a transverse shaft mounted for reciprocable movement with said reciprocating trough, a link pivotally connected to one end of said carrier member and mounted for rectilinear movement with respect to said shaft, another link pivotally connected to the opposite end of said carrier member and mounted for rectilinear movement with respect to said shaft, a holding cam mounted on said shaft and selectively movable into engagement with said one link to positively move said link with said shaft and reciprocating trough during the forward strokes of the conveyor, another holding cam mounted on said shaft and selectively movable into engagement with said other link to positively move said link with said shaft and reciprocating trough during the return strokes of the conveyor, to cause either of said links to engage said grip means with said extensible trough during alternate strokes of the conveyor, and a stopping means associated with each of said holding cams, said stopping means associated with the holding cam for one link being movable into position to engage said other link upon movement of said holding cam for said other link into position to engage said other link, and said stopping means associated with said holding cam for said other link being movable into position to engage said one link when said holding cam for said one link is in engagement therewith, to assure positive engagement and disengagement of said grip means for substantially the full length of alternate strokes of the conveyor.

9. In a feeding mechanism for shaker conveyors, two reciprocating troughs, one of which is extensible with respect to the other, a carrier member, friction grip means mounted on said carrier member for engagement with said extensible trough, a transverse shaft mounted for reciprocable movement with said reciprocating trough, a link pivotally connected to one end of said carrier member and mounted for rectilinear movement with respect to said shaft, another link pivotally connected to the opposite end of said carrier member and mounted for rectilinear movement with respect to said shaft, a holding cam mounted on said shaft and selectively movable into engagement with said one link to positively move said link with said shaft and reciprocating trough during the forward strokes of the conveyor, another holding cam mounted on said shaft and selectively movable into engagement with said other link to positively move said link with said shaft and reciprocating trough during the return strokes of the conveyor, to cause either of said links to engage said grip means with said extensible trough during alternate strokes of the conveyor, and a stopping means associated with each of said holding cams, said stopping means associated with the holding cam for one link being movable into position to engage said other link upon movement of said holding cam for said other link into position to engage said other link, and said stopping means associated with said holding cam for said other link being movable into position to engage said one link when said holding cam for said one link is in engagement therewith, to assure positive engagement and disengagement of said grip means for substantially the full length of the forward and return strokes of the conveyor, and a single operating lever on said shaft for pivoting said shaft to move said holding cams into position to engage both of said links to move said extensible trough with said reciprocating trough, and to move said holding cams into position to engage either one of said links and reciprocably move either one of said links in both directions of movement of said reciprocating trough for substantially the full length of the strokes of said reciprocating trough.

WILLIAM W. SLOANE.